Patented Mar. 24, 1942

2,277,083

UNITED STATES PATENT OFFICE 2,277,083

COMPOSITION

George Lowrance Dorough, Wilmington, Del., assignor to E. I. du Pont de Nemours & Company, Wilmington, Del., a corporation of Delaware No Drawing. Application June 5, 1940,
Serial No. 339,005

20 Claims. (Cl. 260—73)

This invention relates to improved coating and adhesive compositions and especially to improved hydrolyzed polyvinyl acetate and condensation products of polyvinyl alcohol with aldehydes and ketones (acetals of polyvinyl alcohol).

Polyvinyl acetals and hydrolyzed polyvinyl acetate have been proposed for use in coating compositions but have been seriously limited in their applications because of their water sensitivity. Certain of these resins, most notably the butyral of polyvinyl alcohol, have excellent adhesive properties. Although these adhesive products can be used under comparatively mild laminating conditions, they require cooling under pressure due to their thermoplasticity. Moreover, the resulting laminations have insufficient strength when wet or when subjected to elevated temperatures.

This invention has as an object polyvinyl alcohol resins modified to improve their resistance to water. Another object is the provision of modified polyvinyl alcohol resins of improved laminating and adhesive properties. A further object is the provision of thermosetting compositions. A still further object is the provision of new coating compositions, and new adhesive compositions. Another object is the provision of processes for modifying polyvinyl alcohol resins. Other objects will appear hereinafter.

These objects are accomplished by the following invention wherein a polyvinyl compound in which a portion not exceeding 50% of the carbon atoms of the polyvinyl chain are directly attached to hydroxyl groups (hereinafter called "hydroxylated polyvinyl resins") is treated with an organic compound having a plurality of —N=C=A groups wherein A is oxygen or sulfur. The term "polyvinyl chain" as used herein has its usual meaning, i. e., a long hydrocarbon chain formed by the polymerization of a vinyl compound $CH_2=CHX$ and having the structure

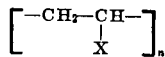

wherein X is a monovalent atom or radical and $n$ is a number whose magnitude depends on the degree of polymerization. In polyvinyl alcohol,

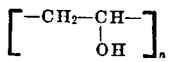

50%, or substantially 50%, of the carbon atoms of the polyvinyl chain are attached to hydroxyl groups. In other hydroxylated polyvinyl resins coming within the scope of this invention, such as partially hydrolyzed polyvinyl esters, partially acetalized polyvinyl alcohol, interpolymers of polyvinyl alcohol, etc. less than 50% of the carbon atoms of the polyvinyl chain are attached to hydroxyl groups.

In a preferred embodiment of the invention, i. e., when the hydroxylated polyvinyl resin is to be used in a coating composition, it is dissolved in a solvent, e. g., an ether, hydrocarbon, chlorinated hydrocarbon, ester, or amide type solvent, which will not react with the modified, and to this solution is added at room temperature a low proportion of a diisocyanate or diisothiocyanate. A film from this composition either on air-drying or baking is found to have improved water resistance, toughness, and hardness over an unmodified control.

To avoid decomposition of the diisocyanate or diisothiocyanate by water, no appreciable amount of water should be present in the above composition. It has been found, however, that the commercially available resins falling under the scope of the present invention are sufficiently free of water to be employed without any dehydrating treatment.

In another preferred embodiment of the invention, i. e., when the hydroxylated polyvinyl resin is to be used in an adhesive composition, it can be dissolved in any type of volatile solvent from which it is applied to the object by any of the usual methods, such as by brushing, roller coating or spraying. The solvent is allowed to flash off briefly, then a dilute solution of the modifier in a non-reactive solvent such as listed above is applied over the coated section by any method such as brushing, roller coating, or spraying. After a brief air-drying period sufficient to allow most of the solvent to volatilize, the treated parts are laminated under pressure at 50–120° C. The resulting lamination need not be cooled under pressure and is characterized by improved strength, particularly in the presence of moisture and/or elevated temperatures.

The more detailed practice of the invention is illustrated by the following examples, wherein parts given are by weight. These are of course many forms of the invention other than these specific embodiments.

Example I

This example illustrates the effect of a diisocyanate on a partially hydrolyzed polyvinyl acetate having 10% of the ester groups hydrolyzed to hydroxyl groups.

To 100 parts of a 10% solution of the resin in dry dioxan is added 1 part of hexamethylene diisocyanate. After mixing thoroughly, a film is flowed and baked at 100° C. for one-half hour. The finish is found to be light colored and harder and tougher than a control film prepared similarly except that the diisocyanate treatment is omitted. The treated baked film, moreover, is insoluble in dioxan while the control is completely soluble.

In another mode of carrying out the treatment, the above partially hydrolyzed polyvinyl acetate having 10% of the ester groups hydrolyzed to hydroxyl groups is pulverized and ground for some time with 10% of its weight of hexamethylene diisocyanate, and then molded at 130° C. for ten minutes under 6,000 lbs. per sq. in. pressure. The resulting chip is light colored, flexible and insoluble in dioxan. A control chip containing no diisocyanate is found to be completely soluble in dioxan.

*Example II*

This example illustrates the use of a diisocyanate-modified, partially hydrolyzed polyvinyl acetate adhesive for plywood.

Thin maple strips are coated with a 5–10% solution of the resin (see table below) in alcohol or water, the solvent allowed to evaporate, and the coated portion then coated with a 20% solution of hexamethylene diisocyanate in dry toluene. The strips are laminated immediately at 120° C. for ten minutes at 100 lbs. per sq. in. pressure. The laminations are tested by suspending them under a shearing stress of 5 lbs. per sq. in. in an oven or in water, raising the temperatures, and noting the temperature at which the lamination fails. The results of the tests are given in the following table:

| Polyvinyl acetate percent hydrolyzed | Hexamethylene diisocyanate treatment | Temperature at failure | |
|---|---|---|---|
| | | In oven | In water |
| | | °F. | °F. |
| 50 | No | 350+ | 129 |
| 50 | Yes | 350+ | 163 |
| 78 | No | 300 | 128 |
| 78 | Yes | 350+ | 183 |
| 94 | No | Did not laminate | |
| 94 | Yes | 350+ | 199 |

The diisocyanate treatment thus raises the temperature at which the laminations fail, particularly under water. The 94% hydrolyzed polyvinyl acetate which normally cannot be used as an adhesive because it will not laminate, gives excellent bonds when modified with a diisocyanate.

Improved adhesion for plywood is likewise obtained from acetals, including ketals, of polyvinyl alcohol modified similarly by a diisocyanate treatment. In addition to the decrease in thermoplasticity and increase in water resistance indicated by the test described above, all the laminations are characterized by improved strengths both dry and wet as measured in a breaking machine as indicated in the table below:

| Treatment | Lamination | Breaking strengths | |
|---|---|---|---|
| | | Dry | Wet after soaking one hr. in boiling water |
| | | Lbs./in.² | Lbs./in.² |
| Hexamethylene diisocyanate | ½ hr. at 75° C | 1,245 | 455 |
| None | do | 710 | 0 |

The above process can be applied to many other materials besides wood, such as leather, cloth, and nylon coated fabric, giving bonds having improved strength and water resistance.

*Example III*

This example illustrates the modification, with a diisocyanate, of a polyvinyl alcohol derived from polyvinyl acetate having 96–98% of the acetate groups hydrolyzed.

An unsupported film of the polyvinyl alcohol 0.002″ thick is dried at 100° C. for a short time, then is coated with a 20% solution of hexamethylene diisocyanate in dry dioxan and finally baked at 100° C. for one and one-half hours. The resulting film is colorless and harder when scratched than the original film and is insoluble in water while the original film is readily soluble in water. The same effect can be secured by soaking the film for one hour in the diisocyanate solution maintained at 100° C.

*Example IV*

This example illustrates the effect of a diisocyanate on films of selected acetals and ketals of polyvinyl alcohol.

The diisocyanate is added to a dilute solution of the resin, a film thereof flowed on glass, and after air drying the film twenty-four hours, it is soaked in water for sixteen hours and then inspected. The results are summarized in the following table:

| Polyvinyl alcohol derivative | Hexamethylene diisocyanate | Solvent | Appearance after immersion in water |
|---|---|---|---|
| | Percent | | |
| Formal | 0 | Dioxan | Whitened badly. |
| Do | 6 | do | Whitened slightly. |
| Do | 26 | do | Not affected. |
| Butyral | 0 | Dimethyl formamide. | Whitened slightly. |
| Butyral | 6 | do | Not affected. |
| Ethyl methyl ketal | 0 | do | Whitened badly. |
| Do | 3 | do | Not affected. |

Thus the water resistance is greatly improved by the diisocyanate treatment.

Good results are obtained when wood plies coated with the butyral of polyvinyl alcohol are further coated with 0.1 to 5% of hexamethylene diisocyanate and the plies are laminated at 60–125° C.

Any hydroxylated polyvinyl resin may be used in the process of the present invention including partially and substantially completely hydrolyzed polyvinyl esters, and acetals, including ketals, of the hydrolyzed esters. The resin must be a polyvinyl alcohol resin, i. e., it must have hydroxyl groups directly attached to the reaction residue of the vinyl group. The original polyvinyl ester can be low, medium, or high molecular weight and can be hydrolyzed by any of the methods known in the art such as acid or alkali catalyzed hydrolysis in the presence or absence of a solvent or diluent. The degree of hydrolysis can be controlled and stopped at any point by any method such as neutralizing or destroying the catalyst, decreasing the temperature, or flooding with water. Suitable polyvinyl esters include polyvinyl formate, acetate, butyrate, and laurate or mixtures or interpolymers thereof. A material of particular interest is commercial polyvinyl alcohol, a product obtained by substantially complete hydrolysis of polyvinyl acetate but which nevertheless may contain small residual amounts of acetate groups. The invention includes within its scope the treatment of interpolymers of polyvinyl esters which have been hydrolyzed to polyvinyl compounds having a portion up to 50% of the carbon atoms of the polyvinyl chain attached to hydroxyl groups. Such interpolymers can contain two or more ingredients. Typical are interpolymers of vinyl acetate or vinyl formate with methyl methacrylate, maleic anhydride, or vinyl chloride.

The invention includes also within its scope the treatment of any type of condensation product of polyvinyl alcohol (providing sufficient hydroxyl groups remain) such as with organic acids or their anhydrides, etc., metal alcoholates (to yield ethers), or aldehydes and ketones. The polyvinyl alcohol can be prepared by any of the methods known to the art such as the substantially complete acid catalyzed hydrolysis of polyvinyl esters, such as polyvinyl acetate. It is not necessary to use completely hydrolyzed polyvinyl acetate; in fact, certain advantages result from the use of a polyvinyl alcohol containing a low proportion such as 1–10% of residual ester groups remaining in the resin molecule. The process is also applicable to hydrolyzed polyvinyl thioacetate, its interpolymers and derivatives.

The condensation of the polyvinyl alcohol with the aldehyde can be carried out using any of the methods described in the art, such as the acid catalyzed reaction followed by substantially complete removal of the catalyst and any excess aldehyde by thorough washing with water. The aldehyde can be aliphatic, cycloaliphatic, or aromatic, can be saturated or unsaturated, and can contain other functional groups such as nitro, halo, ether, hydroxy, carboxy, carbalkoxy, cyano or mercapto groups. Examples of useful aldehydes include: formaldehyde, acetaldehyde, 2-methyl butyraldehyde, lauraldehyde, benzaldehyde, 1-cyclohexylpropionaldehyde, acrolein, crotonaldehyde, chloral, para-nitrobenzaldehyde, ethoxyacetaldehyde, glyceraldehyde, omega-carboxybutyraldehyde or its esters, meta-cyanocinnamaldehyde, and mercaptoacetaldehyde, or combinations thereof. The condensation of the polyvinyl alcohol with aliphatic and aromatic ketones can be carried out by any of the methods known in the art and preferably by an interchange reaction between a ketal and polyvinyl alcohol in the presence of an acidic catalyst. With cyclic ketones, the condensation can be carried out by reacting the ketone and polyvinyl alcohol in the presence of an acidic catalyst. Examples of ketones include: acetone, ethyl methyl ketone, butyl methyl ketone, dibutyl ketone, acetophenone, benzophenone, and cyclohexane. Ketals prepared from these ketones and lower aliphatic alcohols are operable in the interchange reaction. Partially hydrolyzed polyvinyl acetate can also be converted to acetals and ketals which are included among the compounds which are operable.

The invention is not limited to hydroxylated polyvinyl resins alone. The process can also be applied to compositions of such resins with pigments, synthetic resins, nylons, natural resins, plasticizers, driers, fillers, waxes, inhibitors, catalysts, solvents, and the like. As examples of synthetic resins may be mentioned unmodified or oil modified alkyd resins, pyroxylin, organic cellulose esters such as cellulose acetate, cellulose ethers such as ethyl cellulose, polyacrylates and polymethacrylates, polystyrene, polyvinyl esters such as polyvinyl acetate, polyvinyl chloride, polyvinyl alcohol, polyvinyl acetals and ketals, urea-formaldehyde resins, amide-formaldehyde resins, phenol-formaldehyde resins, aldehyde- and ketone-formaldehyde resins, amine-formaldehyde resins, ester gum, hydrogenated phenol-formaldehyde resins, hydrogenated rosin, limed rosin or leaded rosin, and phenolic resin modified rosin or ester gum. Examples of suitable natural resins include rosin, copal, kauri, congo, manilla, damar and shellac. Examples of suitable plasticizers include lower melting triglyceride oils, alkyl resins, phthalate esters, phenols, mineral oils and polyhydric alcohols.

In the process of the present invention there may be employed, for treatment of the hydroxylated polyvinyl resin, any organic compound having a plurality of groups —N=C=A wherein A is oxygen or sulfur, including ethylene diisocyanate, tetramethylene diisocyanate and the other polymethylene diisocyanates and diisothiocyanates, 1,4-cyclohexanediol diisocyanate,

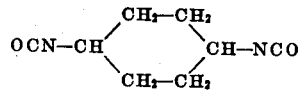

para-isocyanatobenzyl isocyanate,

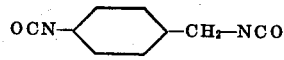

p-phenylene diisothiocyanate, 2,3-dimethyltetramethylene diisocyanate, p,p'-diphenylene diisothiocyanate, 2-chlorotrimethylene diisocyanate, 5-nitro-1,3-phenylene diisocyanate, meta-isocyanato-cinnamyl isocyanate,

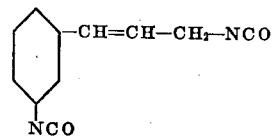

bis-2-isocyanatoethyl ether,

OCN—CH$_2$—CH$_2$—O—CH$_2$—CH$_2$—NCO and its corresponding sulfide and 1,5-diisocyanate-3-pentanone,

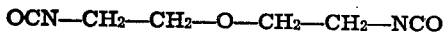

1,2,4-benzene triisothiocyanate and butane-1,2,2-triisocyanate. Compounds having two —N=C=A groups are preferred because of their availability and for reasons of cost. Compounds wherein the organic radical joining the, preferably two, —N=C=A groups, is an organic hydrocarbon radical are likewise preferred. For similar reasons polymethylene diisocyanates and diisothiocyanates are most useful.

The conditions of treating the resins of the present invention with modifiers can vary widely depending on the type of material involved and the effects desired. Although many of the effects desired can be secured at room temperature, it is frequently advantageous to accelerate the effect through application of heat, the upper temperature limit being the decomposition point of the material involved. In working with solutions of the hydroxylated polyvinyl resins and diisocyanates or diisothiocyanates, it is frequently necessary to formulate the mixtures just prior to use because of their tendency toward gelation. This instability is, of course, avoided by the use of a 2-step process in which the resin is treated in situ with the modifier. This latter method of carrying out the modification which is preferred in the present invention, can be effected by any suitable process such as by spraying, roller coating dipping, tumbling, brushing, or rubbing. Best results are secured, with maximum economy, by using a solution of the modifier in a non-reactive solvent such as a hydrocarbon, ether, ester, chlorinated hydrocarbon, or an amide. In some cases it is desirable to reverse the above procedure, that is, the modifier is first applied to the substrate followed by an application of the resin. The temperature range which would ordinarily be used is 20–150° C. and preferred results are obtained at 50–125° C.

When the products of this invention are to be used in molding compositions, it is possible either to mix the resin and the modifier prior to molding or to prepare an unmodified molded article first, followed by treating with the modifier. This latter treatment, which can be carried out by any suitable process such as dipping, spraying, tumbling or brushing, produces moldings characterized by improved surface hardness and resistance to marring and solvents.

Another method of carrying out the modification is to dissolve the hydroxylated polyvinyl resin in a non-reactive solvent, such as those indicated above, add a low proportion of modifier, and heat the mixture at 80–120° C. until the desired reaction has taken place. This process requires about one-half to two hours and can be used only where the proportion of modifier is below that which causes gelation to take place. Products prepared in this way are stable toward gelation on aging and are characterized by having improved water resistance and hardness in films, moldings, or adhesive compositions.

The optimum proportion of modifier also depends on the type of resin being treated and on the effect desired and is readily determined by simple tests for each new resin or composition. In many cases it is not known accurately how much modifier actually is consumed. Thus, in spraying a solution of the modifier on wood coated with polyvinyl acetal adhesive composition and then laminating, the actual increase in weight due to the presence of the modifier is small and cannot be determined with accuracy. However, 0.1–10% of modifier, based on the weight of the resin, represents the most important range of operable proportions. With the butyral of polyvinyl alcohol 0.1 to 5.0% of hexamethylene diisocyanate gives preferred results at 50–125° C. Since the modifier is most frequently applied from solution, a very convenient way of varying the proportion of the modifier is to vary the concentration of the solution. It has been found that solutions of the modifier as dilute as 2% are operable although in most cases it is preferable to work in the range of 10–50%.

The products of this invention are useful as vehicles in improved air-drying or baking coating compositions and can be used to coat metal or wood directly or over a suitable base coat and can also be used on glass, leather, stone, cloth, paper, rubber, or cellulose. They are useful also as interliners for safety glass, as ingredients for molding compositions, and particularly as adhesives for glass, metal, wood, leather, cork, paper, nylon, nylon coated fabrics and pyroxylin coated fabrics. Certain of them are also particularly useful as transparent foils for wrapping or packaging purposes.

The process is useful, moreover, in shortening the laminating cycle required for materials bonded with acetals and ketals of polyvinyl alcohol or of partially hydrolyzed polyvinyl acetate, or of the partially hydrolyzed polyvinyl acetate itself. This improvement results from the conversion of the thermoplastic resins to thermosetting resins, thereby making it unnecessary to cool the laminations under pressure.

The above description and examples are intended to be illustrative only. Any modification of or variation therefrom which conforms to the spirit of the invention is intended to be included within the scope of the claims.

What is claimed is:

1. Process which comprises treating, at 50–125° C., the butyral of polyvinyl alcohol with 0.1 to 5.0%, based on the weight of the resin, of hexamethylene diisocyanate.

2. Process which comprises treating, at 20–150° C., a hydroxylated polyvinyl resin with 0.1–10%, based on the weight of the resin, of an aliphatic diisocyanate.

3. Process which comprises treating a hydroxylated polyvinyl resin with an aliphatic diisocyanate.

4. Process which comprises treating a hydroxylated polyvinyl resin with an organic diisocyanate.

5. Process which comprises treating a hydroxylated polyvinyl resin with an organic compound having a plurality of —N=C=A groups wherein A is selected from the class consisting of oxygen and sulfur.

6. A potentially reactive composition comprising a hydroxylated polyvinyl resin and an organic compound having a plurality of —N=C=A groups wherein A is selected from the class consisting of oxygen and sulfur.

7. A resinous condensation product of a hydroxylated polyvinyl resin and an organic compound having a plurality of —N=C=A groups wherein A is selected from the class consisting of oxygen and sulfur.

8. A resinous condensation product of an at least partially hydrolyzed polyvinyl acetate resin and an organic compound having a plurality of —N=C=A groups wherein A is selected from the class consisting of oxygen and sulfur.

9. A resinous condensation product of an only partially hydrolyzed polyvinyl acetate resin and an organic compound having a plurality of —N=C=A groups wherein A is selected from the class consisting of oxygen and sulfur.

10. A resinous condensation product of a hydroxylated polyvinyl resin and an organic diisocyanate.

11. A resinous condensation product of a hydroxylated polyvinyl resin and an aliphatic diisocyanate.

12. A resinous condensation product of a hydroxylated polyvinyl resin and an aliphatic hydrocarbon diisocyanate.

13. A resinous condensation product of a hydroxylated polyvinyl resin and a polymethylene diisocyanate.

14. A resinous condensation product of a hydroxylated polyvinyl acetal resin and an aliphatic diisocyanate.

15. A resinous condensation product of a hydroxylated polyvinyl acetal resin and a polymethylene diisocyanate.

16. A resinous condensation product of a hydroxylated polyvinyl butyral resin and an aliphatic diisocyanate.

17. A resinous condensation product of a hydroxylated polyvinyl butyral resin and a polymethylene diisocyanate.

18. A resinous condensation product of a hydroxylated polyvinyl butyral resin and hexamethylene diisocyanate.

19. A resinous condensation product of partially hydrolyzed polyvinyl acetate resin and hexamethylene diisocyanate.

20. A resinous condensation product of hydroxylated polyvinyl formal resin and hexamethylene diisocyanate.

GEORGE LOWRANCE DOROUGH.

CERTIFICATE OF CORRECTION.

Patent No. 2,277,083.                                         March 24, 1942.

GEORGE LOWRANCE DOROUGH.

It is hereby certified that error appears in the printed specification of the above numbered patent requiring correction as follows: Page 1, second column, line 5, for "modified" read --modifier--; page 3, first column, line 47-48, for "cyclohexane" read --cyclohexanone--; and that the said Letters Patent should be read with this correction therein that the same may conform to the record of the case in the Patent Office.

Signed and sealed this 2nd day of June, A. D. 1942.

(Seal)

Henry Van Arsdale,
Acting Commissioner of Patents.